![United States Patent Office]

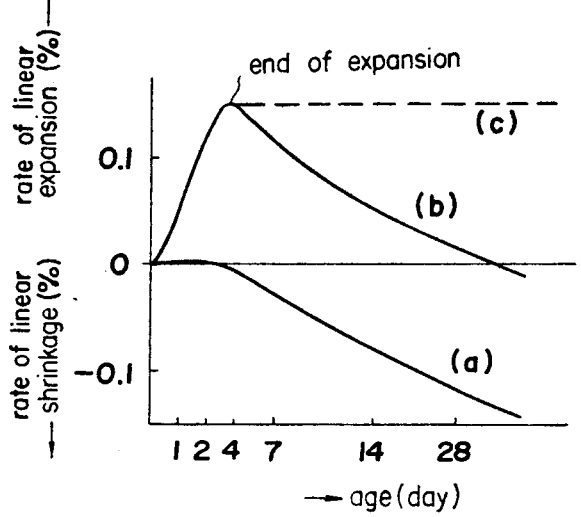
Fig. 1 expansion-shrinking curve of various cements
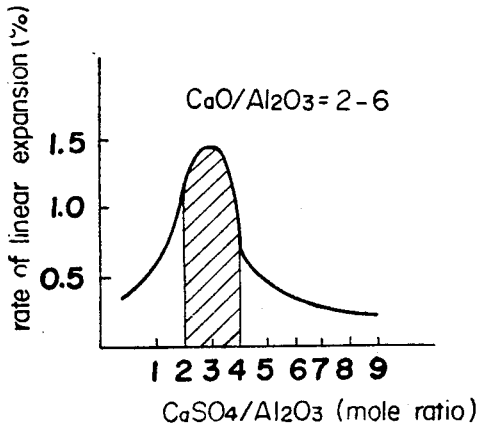
Fig. 2
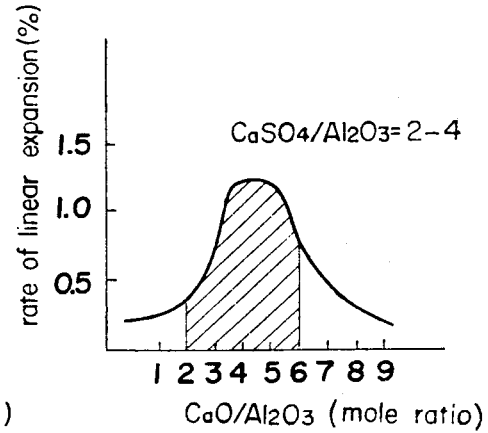
Fig. 3

3,510,326
Patented May 5, 1970

---

3,510,326
EXPANSIVE CEMENT AND THE METHOD OF PRODUCING SUCH CEMENT
Minoru Miki, 407–7 4-chome, Setagaya,
Setagaya-ku, Tokyo, Japan
Filed Dec. 16, 1966, Ser. No. 602,356
Claims priority, application Japan, Dec. 24, 1965,
40/79,238
Int. Cl. C04b 7/04, 7/32
U.S. Cl. 106—89        8 Claims

ABSTRACT OF THE DISCLOSURE

An expansive cement containing, as the expansive additive, a material obtained by burning a raw material comprising calcium oxide, aluminum oxide and calcium sulfate in certain proportions and crushing the burnt product to obtain a particular grain size distribution. The expansive cement of this invention expands during the initial curing period and thereafter substantially maintains the originally expanded shape.

---

The present invention relates to an expansive cement and the method of producing such cement. Conventional cements have a serious disadvantage in that they shrink and cause cracks on hardening and drying. In order to obviate such disadvantageous shrinkage of cement, various methods of preventing shrinkage have been studied utilizing an expanding force of cement bacillus for years. For instance, there is a method for obtaining non-shrinkable cements by means of adding calcium sulfoaluminate as an expansive additive for forming cement bacillus in cement (refer to Japanese patent application publication No. 14,700/1964).

However, in the manufacture of expansive cement, it has not been definitely established what kind of an expansive additive is to be added at what state. Even by the above known method, it has merely been described that a compound having the chemical composition (in mole ratios) of $CaO:Al_2O_3:SO_3$ of 2 to 4:1 to 2:1 can be used. According to our actual experiments when $SO_3$ is limited to 1, even if the amount of the other chemical components CaO and $Al_2O_3$ are changed in any ratio within said ranges, the desired expansion can not be obtained, so that it has been found that a completely expansive cement cannot be obtained by the above method.

The curve as shown in FIG. 1 is an expansion-shrinking curve resulting from the curing of cement in air, wherein (a) designates a shrinking curve of portland cement for comparison and (b) designates an expansion-shrinking curve of conventional expansive cement. As can be seen from curve (b) in the figure, taking the maximum expansion time as a starting point, the shrinking rate following expansion is as same as in the case of portland cement. This property has the effect of delaying the period within which cracks are generated theoretically, but cannot completely prevent generation of cracks by shrinking.

The principal object of the present invention is to provide an ideal expansive cement having a curve (c) by eliminating the disadvantages of conventional expansive cement.

Calcium sulfo-aluminate is usually manufactured by crushing and blending a raw material containing chemical components such as CaO, $Al_2O_3$ and $SO_3$ and by burning it at a temperature around 1,200° C. in a rotary kiln. In this case, the basic idea is clear that the resultant minerals such as $3CaO \cdot 3Al_2O_3 \cdot CaSO_4$ are hydrated in the presence of free CaO and free $CaSO_4$ to cause the formation of crystalline $3CaO \cdot Al_2O_3 \cdot CaSO_4 \cdot 12H_2O$ or $3CaO \cdot Al_2O_3 \cdot 3CaSO_4 \cdot 32H_2O$, i.e. cement bacilli which compensate shrinkage of cement, thereby forming an expansive cement, but it is difficult to prevent shrinkage of cement and form a perfectly expansive cement by adding to the cement only an expansive component which produces cement bacilli. That is to say, in view of the fundamental properties of cement, conventional expansive cement has such properties that shrinkage of the cement is small in its early curing period and becomes larger with the lapse of time, so that, though it has been previously considered simply that the shrinkage can be prevented by causing an amount of expansion equal to the amount of shrinkage however, the inventors have found that, in the case of conventional expansive cement, although a desirable expansion to compensate the shrinkage occurring in the early stage of curing is obtained, the cured cement continues to shrink with the lapse of time and the expanded shape cannot be maintained. Accordingly, the ideal expansive cement should be able to maintain substantially the originally expanded shape, even after the early curing stage.

After numerous studies on the above features, the inventor has found that in order to obtain the desired expansive cement the chemical composition of the raw material used to manufacture the calcium sulfo-aluminate expansive component must be limited in a certain range, and moreover there must be a proper distribution of grain size of the crushed raw material.

The present invention relates to expansive cement prepared by adding an additive to ordinary cement, said additive being produced by burning a raw material in which the mole ratio of $CaO:Al_2O_3:CaSO_4$ is 2 to 6:1:2 to 4 and then crushing the sintered product so as to obtain a grain size distribution wherein a grain size of less than 44μ is 0.1 to 10% by weight, a grain size of 44 to 250μ is 70 to 99.8% by weight and a grain size of more than 250μ is 0.1 to 20% by weight.

For a better understanding of the invention, reference is made to the accompanying drawings, wherein:

FIG. 1 is a comparative chart of expansion and shrinkage of cement as described above;

FIGS. 2 and 3 are curves illustrating the rate of linear expansion obtained by the use of expansive additives containing different proportions of components.

Figure 4:
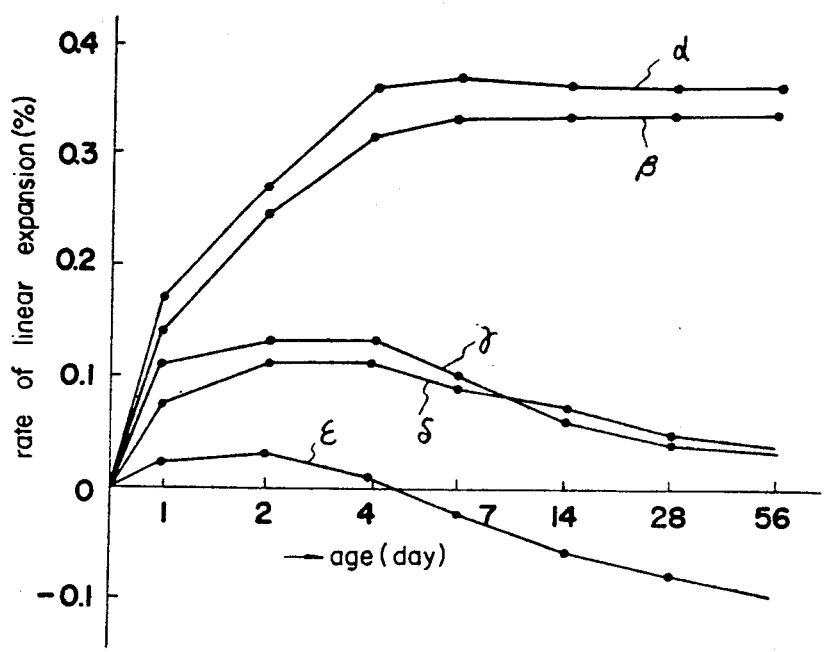
FIG. 4 is a graph showing a relation between grain size distribution of the expansive additive and the expansion behaviour of the expansive cement in the case of addition of a given amount of the expansive additive.

FIGS. 2 and 3 are curves of the rate of linear expansion of mortar samples of expansive cement having ratio of 1:2 according to JIS–R5201 measured at the age of 7 days when curing at 20° C. in water, which is prepared by adding 13% of the expansive additive to portland cement, based on the total amount of the portland cement and the additive, said expansive additive being formed by the blending of raw materials of main chemical composition CaO, $Al_2O_3$ and $CaSO_4$ in mole ratios of $$CaO:Al_2O_3:CaSO_4$$

of about 2 to 6:1:2 to 4 and then burning the mixture. As is apparent from the figures, additives having mole ratios outside of these ranges have a considerably lower rate of linear expansion. Furthermore, the expansion component having said composition range, after sintering, is crushed into a proper grain size and mixed with cement to prepare an expansive cement. However, the ability to prevent shrinkage varies with the grain size of the expansive additive. That is, an expansive component clinker, obtained by sintering, is crushed to obtain various grain size distributions and added to portland cement in an amount of 13% based on the total amount of said expansive additive and cement. The expansion-shrinking curve of such a cement is shown in FIG. 3. Here, the rate of linear expansion of the sample is determined according to the method set forth in Japanese Industrial Standard (JIS) R5201. In this method, a 1:2 mortar is formed to 4 cm. x 4 cm. x 16 cm. and cured in air of 100% RH at a temperature of 20° C. for 24 hours, then removed from the mold and the length of the molded product at this time is determined as a basic length. Then the molded product is cured in air at 50% RH and at a temperature of 20° C. and the variation of length is determined according to the hereinbelow defined Comparator Method. Moreover, the age of the sample for determining the rate of linear expansion is 0 day when the molded product is removed from the mold. Test values of the rate of linear expansion as described in the following examples are determined by the same method as above. Each curve of FIG. 4 is a different grain size distribution as indicated in the following table.

TABLE 1.—GRAIN SIZE DISTRIBUTION

| Grain size | α Content (percent) | β Content (percent) | γ Content (percent) | δ Content (percent) | ε Content (percent) |
|---|---|---|---|---|---|
| 44μ< | 5.8 | 9.8 | 22.4 | 1.8 | 51.4 |
| 44 to 250μ | 93.6 | 71.1 | 67.1 | 34.7 | 48.5 |
| 250μ> | 0.6 | 19.1 | 10.5 | 63.5 | 0.1 |

JIS–R5201

(1) A sample for determining the strength of mortar is produced by mixing cement (when adding calcium sulfo-aluminate, said cement contains calcium sulfo-alumnate), sand having a grain size of 0.1 to 0.3 mm. and water in a mixture ratio of 1:2:0.63 by weight respectively thoroughly, introducing the resulting mixture into a mold having dimensions of 4 cm. x 4 cm. x 16 cm., molding said mixture and removing the molded product from the mold after 24 hours. Then, the molded product is cured in water at 20° C.

(2) The rate of linear expansion of the mortar is determined as follows: The sample, molded in the same manner as described in the strength test, is removed from the mold after 24 hours and at the same time both ends of the sample are marked in line by applying glass pieces to it and the length between both the ends is measured by Comparator (a linear measurement device) to determine the standard length. Then, the sample is cured in water at 20° C. and the lengths between the marked lines on the glass pieces are measured by the Comparator at every given age. The rate of linear expansion is shown by the ratio of variation with respect to the standard length.

From Table 1 and FIG. 4, it is apparent from curves γ, δ, ε that when grain size of expansive additive is finer or coarser than the range of 44 to 250μ, a shrinking phenomenon occurs after the completion of expansion. On the other hand, in curves α and β, dry shrinkage never appears even after expansion has reached the peak, and an ideal expansive cement can be obtained. From this data, it has been found that expansive additives have a proper grain size range and, as a result, the range has been found as set forth in the following Table 2.

TABLE 2.—PROPER GRAIN SIZE DISTRIBUTION

| Grain size: | Content (percent) |
|---|---|
| Less than 44μ | Less than 10. |
| 44 to 250μ | More than 70. |
| More than 250μ | Less than 20. |

It is not yet theoretically clear why this grain size distribution is necessary, but a conventional expansive additive has substantially the same grain size as that of cement and consists mainly of grain sizes of less than 44μ, while the expansive additives of the present invention consist mainly of coarse grain sizes of 44 to 250μ. Thus, by employing coarser grain sizes, the formation of cement bacilli upon hydration is delayed more than it is with conventional additives. As a result, during the course of dry-shrinkage of cement, expansion of cement bacilli is continued to compensate for the dry-shrinkage completely and the amount of expansion at the primary expansion peak can be maintained.

As described above, the objects of the present invention are to manufacture ideal expansive cement without shrinkage after expansion by adding an additive in a proper amount to ordinary cement, said additive being produced by sintering an expanding agent the calcium sulfo-aluminate type, the raw material of which contains CaO, $CaSO_4$ and $Al_2O_3$ in mole ratios of $CaO:Al_2O_3:CaSO_4$ of 2 to 6:1:2 to 4, and by crushing it to a grain size distribution as shown in Table 2. The expansive cement thus obtained has, as compared with any conventional expansive cement, not only excellent shrinkage preventing properties, but also excellent tenacity and setting properties.

Moreover, expansive cement according to the present invention does not lessen in strength and the setting properties, which are special values required of cement, even containing an added expansive additive, and has the property of preventing shrinkage completely. For purposes of exemplification, the invention has been described with regard to the addition of expansive additives to portland cement, but even when the expansive additive is added to blast furnace cement, silica cement, fly ash cement and alumina cement, expansive cements can be similarly obtained.

In accordance with this invention, the ratio of the expansive additive to the cement is varied according to the result desired, but when the desired result is prevention of shrinkage, the use of about 5 to 15% of the expansive additive in the cement composition is preferable. When less than 5% is employed, hardly any prevention of shrinkage is obtained. Furthermore, when providing positive expansion for the purpose of utilizing chemical pressure, a larger amount than said ratio is required.

The present invention is explained referring to the following embodiments.

Comparative example

For comparing the present invention with a conventional expansive additive, as a raw material, the residue of generated acetylene, burned white bauxite and anhydrous gypsum were used and the mixture was composed in mole ratios of $CaO:Al_2O_3:CaSO_4$ of 3:1:3 and 3:1:1, that $CaO/Al_2O_3=3$, $CaSO_4/Al_2O_3=3$, and 1. Said mixtures were burned in a rotary kiln to prepare calcium sulfo-aluminate and crushed to a Blaine specific surface area of 2,500 cm.²/g. The resulting products were mixed with portland cement in an amount of 13% based on the total amount of the product and the cement and the rate of linear expansion was measured. The results are shown in the Table 3.

TABLE 3.—RATE OF LINEAR EXPANSION (PERCENT)

| | The present invention | Conventional cement |
|---|---|---|
| | Mole ratio of $CaO:Al_2O_3:CaSO_4$ | |
| Day | 3:1:3 | 3:1:1 |
| 1 | 0.157 | 0.001 |
| 2 | 0.349 | 0.005 |
| 4 | 0.769 | 0.020 |
| 7 | 1.223 | 0.033 |
| 14 | 1.284 | 0.053 |
| 28 | 1.311 | 0.059 |

It is apparent from the Table 3 that the present invention has superior rate of linear expansion to the conventional cement.

EXAMPLE 1

410 kg. of slaked lime, 147 kg. of burned white bauxite and 580 kg. of anhydrous gypsum were crushed and mixed to make a 65% slurry of a composition having a mole ratio of $CaO:Al_2O_3:CaSO_4$ of 4:1:3, which was burned in a small rotary kiln at a temperature of 1,200° C. The burned clinker was crushed in a conical ball mill to specific surface area of 1,570 cm.²/g. The chemical composition and the grain size distribution are shown in Tables 4 and 5. When the resulting product was mixed with portland cement in an amount of 13% based on the total amount of the additive and portland cement, and the rate of linear expansion determined. The results are shown in Table 6.

TABLE 4.—CHEMICAL COMPOSITION

|  | Percent |
|---|---|
| Ignition loss | 0.7 |
| Insol. | 3.3 |
| $SiO_2$ | 1.9 |
| $Al_2O_3$ | 10.8 |
| $Fe_2O_3$ | 0.7 |
| CaO | 49.2 |
| MgO | 0.2 |
| $SO_3$ | 32.8 |
| $TiO_2$ | 0.4 |
|  | 100 |

TABLE 5.—GRAIN SIZE DISTRIBUTION

| Grain size: | Content, percent |
|---|---|
| $44\mu >$ | 5.8 |
| 44 to $88\mu$ | 28.0 |
| 88 to $125\mu$ | 19.5 |
| 125 to $250\mu$ | 46.1 |
| $250\mu <$ | 0.6 |
|  | 100 |

TABLE 6.—RATE OF LINEAR EXPANSION

| Days: | Rate of linear expansion, percent |
|---|---|
| 1 | 0.17 |
| 2 | 0.27 |
| 4 | 0.36 |
| 7 | 0.37 |
| 14 | 0.36 |
| 28 | 0.36 |

EXAMPLE 2

360 kg. of the residue of generated acetylene, 167 kg. of burned white bauxite and 590 kg. of anhydrous gypsum $CaO:Al_2O_3:CaSO_4=3:1:3$ were crushed and mixed to obtain 65% of slurry, which was semi-molten, and burned in a small rotary kiln to make clinker, which was crushed to a Blaine specific surface area of 1,500 cm.$^2$/g. 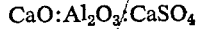 (in grain size distribution less than $44\mu$ is 7.4%, 44 to $88\mu$ is 34.6%, 88 to $125\mu$ is 162.5%, 125 to $250\mu$ is 39.3% and more than $250\mu$ is 2.5%). The resulting product was mixed with portland cement in a ratio of 10% based on the total amount of the additive and the cement to prepare an expansive cement, which was set according to the method of JIS-R5201 and the strength and the rate of linear expansion determined which are shown in the following tables.

TABLE 7.—SETTING PROPERTY

|  | The present invention | Conventional expansive cement | Portland cement |
|---|---|---|---|
| Water content (percent) | 26.2 | 24.0 | 26.0 |
| Start (hr.-min.) | 2-20 | 0-47 | 2-39 |
| Finish (hr.-min.) | 3-37 | 1-27 | 3-41 |

TABLE 8.—STRENGTH

| | Bending (kg./cm.$^2$) | | | Compressive (kg./cm.$^2$) | | |
|---|---|---|---|---|---|---|
| Days | The present invention | Conventional cement | Portland cement | The present invention | Conventional cement | Portland cement |
| 3 | 31.3 | 27.5 | 29.1 | 102 | 103 | 111 |
| 7 | 43.4 | 37.1 | 42.6 | 213 | 158 | 205 |
| 28 | 61.9 | 57.6 | 66.9 | 357 | 300 | 368 |

TABLE 9.—RATE OF LINEAR EXPANSION (PERCENT)

| | Cure in air of 50% RH at a temperature of 20° C. | | |
|---|---|---|---|
| Days | The present invention | Conventional cement | Portland cement |
| 1 | 0.02 | 0.05 | 0.00 |
| 2 | 0.03 | 0.08 | 0.01 |
| 4 | 0.02 | 0.06 | −0.02 |
| 7 | 0.01 | 0.03 | −0.05 |
| 14 | 0.01 | 0.01 | −0.09 |
| 28 | 0.01 | −0.01 | −0.01 |

What I claim is:

1. An expansive cement consisting essentially of a normal cement selected from the group consisting of portland cement, blast furnace cement, silica cement, fly ash cement and alumina cement and a product obtained by burning a raw material in which the mole ratio of $CaO:Al_2O_3:CaSO_4$ is 2 to 6:1:2 to 4, and crushing the burned product, said product being adjusted in grain size distribution in such a manner that a grain size of less than $44\mu$ is 0.1 to 10% by weight, a grain size of 44 to $250\mu$ is 70 to 99.8% by weight and a grain size of more than $250\mu$ is 0.1% to 20% by weight.

2. An expansive cement as claimed in claim 1, wherein said raw material possesses a mole ratio of $$CaO:Al_2O_3:CaSO_4$$

of 4:1:3.

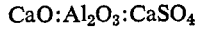

3. An expansive cement as claimed in claim 1, wherein said raw material possesses a mole ratio of $$CaO:Al_2O_3:CaSO_4$$

of 3:1:3.

4. An expansive cement as claimed in claim 1, wherein said product has such a grain size distribution that a grain size of less than $44\mu$ is 5 to 8% by weight, a grain size of $44\mu$ to $250\mu$ is 85 to 95% by weight and a grain size of more than $250\mu$ is 0.5 to 10% by weight.

5. An expansive cement as claimed in claim 1, wherein 99 to 85% by weight of said normal cement is mixed with 1 to 15% by weight of said product.

6. A method of producing an expansive cement, which comprises burning a raw material in which the mole ratio of $CaO:Al_2O_3:CaSO_4$ is at a temperature of 1,100° C. to 1,300° C., crushing the burned product to adjust the grain size distribution in such a manner that a grain size of less than $44\mu$ is 0.1 to 10% by weight, a grain size of $44\mu$ to $250\mu$ is 70 to 99.8% by weight and a grain size of more than $250\mu$ is 70 to 99.8% by weight and a grain size of more than $250\mu$ is 0.1 to 20% by weight and then mixing the resulting product with a normal cement selected from the group consisting of portland cement, blast furnace cement, silica cement, fly ash cement and alumina cement.

7. An expansive cement as claimed in claim 1 wherein said normal cement is portland cement.

8. A method as claimed in claim 6 wherein said normal cement is portland cement.

References Cited

UNITED STATES PATENTS

| 3,303,037 | 2/1967 | Klein | 106—89 |
| 3,251,701 | 5/1966 | Klein | 106—89 |
| 3,155,526 | 11/1964 | Klein | 106—89 |

TOBIAS E. LEVOW, Primary Examiner

W. T. SCOTT, Assistant Examiner

U.S. Cl. X.R.

106—104, 109